United States Patent [19]

Takahashi et al.

[11] 4,135,790

[45] Jan. 23, 1979

[54] ELECTROCHROMIC ELEMENT

[75] Inventors: Youske Takahashi; Hideki Akasaka, both of Kawasaki, Japan

[73] Assignee: Nippon Kogaku K.K., Tokyo, Japan

[21] Appl. No.: 790,486

[22] Filed: Apr. 25, 1977

[30] Foreign Application Priority Data

May 14, 1976 [JP] Japan .................. 51-55073

[51] Int. Cl.$^2$ .................................. G02F 1/23
[52] U.S. Cl. .................................. 350/357
[58] Field of Search .................. 350/357, 353, 363

[56] References Cited

U.S. PATENT DOCUMENTS 4,006,969  2/1977  Kouchi et al. .................. 350/357

*Primary Examiner*—John Zazworsky
*Assistant Examiner*—James W. Davie
*Attorney, Agent, or Firm*—Gerald J. Ferguson, Jr.; Joseph J. Baker

[57] ABSTRACT

An electrochromic element comprising a composite cell composed of a lamination of a plurality of unit cells, at least in partial registry with one another; each of said unit cells having a pair of transparent flat electrodes at least in partial registry with one another and an electrochromic material filling a space between said transparent electrodes, and a transparent substrate for supporting said composite cell.

5 Claims, 5 Drawing Figures

ELECTROCHROMIC ELEMENT

FIELD OF THE INVENTION

The present invention relates to an improvement in electrochromic elements and, particularly, to an improvement in the response speed of electrochromic elements.

DESCRIPTION OF THE PRIOR ART

The conventional electrochromic element composed of an inorganic material comprises a cell having a first transparent electrode 2 provided on a transparent substrate 1, an electrochromic layer 4 of an inorganic material, an electron blocking layer 5 of an insulative material and a second transparent electrode 3 in the order shown in FIG. 1. The thicknesses of the electrodes, the electrochromic layer and the electron blocking layer are usually 0.005μ to 1.5μ, about 0.5μ to 1μ and 0.2μ to 2μ, respectively. These layers are usually formed by using a thin film forming technique such as evaporation, sputtering, ion-plating, etc.

When the electrodes 2 and 3 of this element are connected to a negative and a positive terminals of a d.c. power source 6, respectively, as shown by a solid line in FIG. 1, electrons are injected from the electrode 2 to the electrochromic layer 4 and, simultaneously, positive ions are injected from the electron blocking layer 5 to the electrochromic layer 4, causing the electro-coloration thereof and maintaining the charge neutrality even after the removal of the applied electric field.

The color of the electrochromic layer thus provided can be removed by inverting the connection of the power source to the element as shown by dotted lines in FIG. 1. That is, upon reversal of the polarities of the power source, the electrons in the electrochromic layer 4 may flow into the positive electrode 2 and the positive ions may return to the electron blocking layer to return the electrochromic layer to its colorless state. During this time, the electron blocking layer blocks the flow of electrons from the negative electrode 3 into the electrochromic layer.

Because of the coloration mechanism of the element as mentioned above, the response time of the electrochromic element at the color change depends upon the mobilities of the electron and positive ion in the electrochromic substance layer 4, particularly, the diffusion velocity of the positive ion into the layer. In other words, the response time depends upon the time within which the color center in the electrochromic layer 4 becomes saturated. Therefore, the response time of the conventional electrochromic element composed of an electrochromic layer having a thickness of 0.5-1μ is around 200ms when the electrochromic layer is an inorganic material and around 20ms when the electrochromic layer is an organic material. Thus, for example, when the electrochromic element is to be employed as a display for the control of the iris and/or shutter speed of a camera, it is impossible to use the conventional element because the response time thereof is too long as mentioned above.

Furthermore, in the prior art, one electrochromic element can usually provide only one kind of coloration and it is very difficult to produce a display with a plurality of colors. If the latter be realizable the display function of electrochromic elements will be much improved.

SUMMARY OF THE INVENTION

A primary object of the present invention is to provide an electrochromic element which, when compared to the conventional electrochromic element, has an extremely short response time without any reduction of color density.

Another object of the present invention is to provide an electrochromic element which is capable of displaying data in a plurality of colors.

In order to shorten the response time of the electrochromic element, according to the present invention, the electrochromic layer is made thinner than the conventional layer to shorten the distance the electron and positive ion move in the electrochromic layer 4 where the electrochromic layer is sandwiched between a pair of transparent electrodes to form a unit cell. A plurality of unit cells are stacked to form a multi-layer structure.

DETAILED DESCRIPTION OF PREFERRED EMBODIMENTS

The present invention will be described with reference to embodiments thereof.

Figure 2:
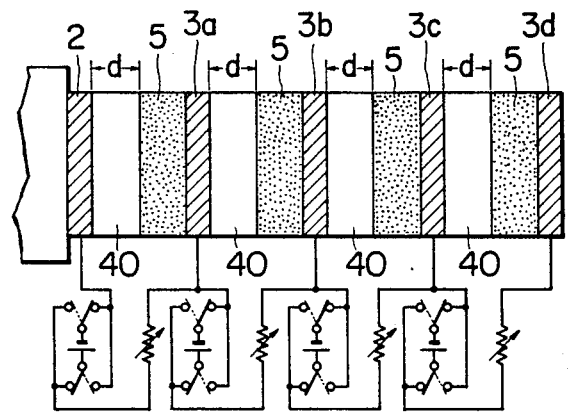
FIG. 2 is a cross section of a first embodiment of the present invention.

In FIG. 2 which shows a first embodiment of the present invention, a transparent electrode 2 is fixedly disposed on a transparent substrate 1 and a layer 40 of an electrochromic material such as molybdenum oxide ($MoO_3$) or tungsten oxide ($WO_3$) etc. is disposed on the transparent electrode 2. On the outer surface of the electrochromic layer 40, an electron blocking layer 5 is disposed and a transparent electrode 3a is arranged on the outer surface of the electron blocking layer 5. The lamination of the electrochromic layer 40 and the electron blocking layer 5 sandwiched by the transparent electrodes will be referred to as a unit cell.

Figure 1:
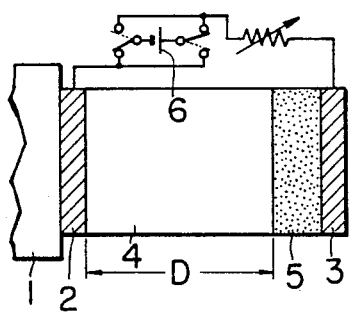
FIG. 1 shows a cross section of an example of a conventional electrochromic element schematically, which was described above.

A plurality, four in this embodiment, of the unit cells are further laminated as shown in FIG. 2. The unit structure is the same as that of the conventional electrochromic element except that the thickness (d) of the electrochromic layer 40 is thinner than that (D) of the conventional element, that is, a fraction of the thickness D of the electrochromic layer 4 of the conventional element in FIG. 1. In this embodiment the thickness d is selected as $d=D/4$ so that the present element having the multilayer structure can provide substantially the same color density as that of the conventional element in FIG. 1.

A d.c. power source 6 is provided for each of the unit cell and is reversibly connected between the electrodes of each unit cell, i.e., between the electrodes 2 and 3a, 3a and 3b, 3b and 3c, or 3c and 3d by suitable reversible switches such as double pole double throw switches.

When the power sources 6 are connected between the respective electrode pairs by throwing the poles of the switches in one direction, the color centers of the respective electrochromic layers 40 due to electrons and positive ions being injected into the respective electrochromic materials may immediately become saturated states respectively so that the response time of the element at the coloration time can be shortened.

The response time of the element at the color-extinction time when the polarities of the batteries are reversed can also be shortened for the same reason as mentioned above.

Since, in this embodiment, the total thickness of the electrochromic layers 40 is made substantially equal to the thickness of the electrochromic layer of the conventional element, the color density of the present element when colored is compatible with that of the conventional element.

The kind of color to be provided by an electrochromic element depends upon the kind of electrochromic material used in the element, i.e., the optical absorption of the electrochromic material employed.

Heretofore, it was impossible to provide all of desired colors by using the electrochromic materials presently available.

In a second embodiment of the present invention, a mixed color of two different colors is provided by using a plurality of different electrochromic materials.

Figure 3:
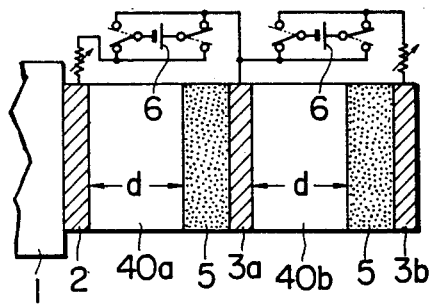
FIG. 3 is a cross section of a second embodiment of the present invention.

In FIG. 3 which shows the second embodiment, an electrochromic element is comprises a lamination of a pair of unit cells. The first unit cell is composed of a lamination of an electrochromic layer 40a and an electron blocking layer 5 both of which are sandwiched between a pair of electrodes 2 and 3a. The second unit structure is composed of a lamination of an electrochromic layer 40b and an electron blocking layer 5 both of which are sandwiched between the electrode 3a and an electrode 3b.

The thickness d of each of the electrochromic layers is selected as nearly equal to D/2 for the same purpose as mentioned before. The layers 40a and 40b are electrochromic materials having different absorption bands. For example, the layer 40a is tungsten oxide which is capable of exhibiting a blue color and the layer 40b is antimony oxide ($Sb_2O_3$) which is capable of exhibiting a yellow color. Since the thicknesses of these layers are very small, these layers can provide the respective color with very short response times when suitable voltages are applied thereto and thus a mixed color, green, derived from blue and yellow can be observed.

Although a pair of the electrochromic layers are used in this embodiment, it is possible to laminate three or more layers composed of electrochromic materials having different absorption bands, so that various mixed colors can be obtained.

A third embodiment of the present invention will be described with reference to FIG. 4.

Figure 4:
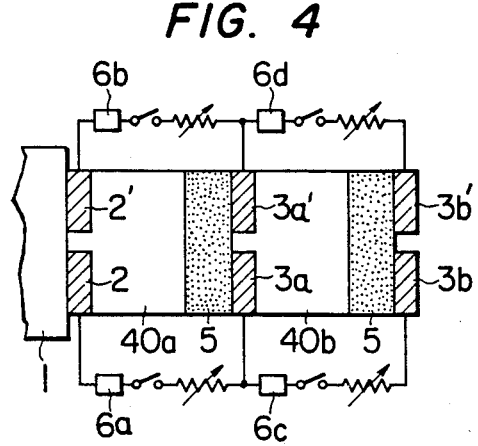
FIG. 4 is a cross section of a third embodiment of the present invention.

The third embodiment in FIG. 4 is similar to that in FIG. 3 except that each of the transparent electrodes is divided into two sections. That is, each lamination of the electrochromic layer and the electron blocking layer is sandwiched between two pairs of parallel electrodes such that the lamination of the electrochromic layer 40a and the electron blocking layer 5 is sandwiched between the electrodes 2 and 2' and between the electrodes 3a and 3a' and the lamination of the electrochromic layer 40b and the electron blocking layer 5, is sandwiched between the electrodes 3a and 3a' and between the electrodes 3b and 3b' as shown. Between the opposing electrodes 2 and 3a, a d.c. power source 6a is connected through a suitable switch and a d.c. source 6b is connected between the opposing electrodes 2' and 3a' via a suitable switch. In the similar manner d.c. power sources 6c and 6d are connected via suitable switches between the electrodes 3a and 3b and between the electrodes 3a' and 3b', respectively.

Figure 5:
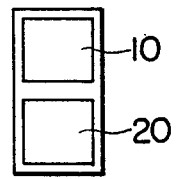
FIG. 5 is a side view of the embodiment in FIG. 4.

FIG. 5 is a right side view of the electrochromic element in FIG. 4. When the power sources 6a and 6d are connected between the electrodes 2 and 3a and between the electrodes 3a' and 3b', respectively, an upper half area 10 of the element is colored yellow and the lower half area 20 is colored blue. On the other hand, when the power sources 6b and 6c are connected between the respective associated electrode pairs, respectively, while the power source 6a and 6d are reversed, the colorations of the areas 10 and 20 will be reversed. It should be noted that by combining appropriate electrode pairs to be simultaneously energized, many kinds of display can be provided by the element in FIG. 4.

Although, in the embodiments described herein before, inorganic materials are used as the electrochromic materials, it should be noted that the present electrochromic element can also be composed of organic electrochromic material. In the latter case, however, the electron blocking layer may be omitted.

What is claimed is:

1. An electrochromic element comprising a composite cell composed of a lamination of a plurality of unit cells at least in partial registry with one another, each of said unit cells having a pair of transparent electrodes at least in partial registry with one another and an electrochromic material filling a space between said transparent electrodes, and a transparent substrate for supporting said composite cell.

2. An electrochromic element as claimed in claim 1, wherein said transparent electrodes of adjacent ones of said unit cells, which are in facing relation to each other, are made integral to form a common transparent electrode.

3. An electrochromic element as claimed in claim 1, wherein at least one of said unit cells has a different electrochromic material from those of the remaining unit cells, said different electrochromic material having an optical absorption band different from those of the electrochromic material of said remaining unit cells.

4. An electrochromic element as claimed in claim 3, wherein at least one of said transparent electrodes of said composite cell is divided into a plurality of sections insulated electrically from each other.

5. An electrochromic element as claimed in claim 1, wherein the total thickness of said electrochromic materials of said composite cell is from about $0.5\mu$ to about $1.0\mu$.

* * * * *